United States Patent
Hosoi et al.

(10) Patent No.: US 6,222,003 B1
(45) Date of Patent: Apr. 24, 2001

(54) OPTICAL FILM AND METHOD FOR PRODUCING SAME

(76) Inventors: Masahiro Hosoi; Tamiaki Nagoshi, both c/o Teijin Limited, Matsuyama Factory, 77, Kitayoshida-cho, Matsuyama-shi, EHIME 791-8530 (JP)

(*) Notice: Subject to any disclaimer, the term of this patent is extended or adjusted under 35 U.S.C. 154(b) by 0 days.

(21) Appl. No.: 09/445,954

(22) PCT Filed: Jun. 18, 1998

(86) PCT No.: PCT/JP98/02718
§ 371 Date: Dec. 16, 1999
§ 102(e) Date: Dec. 16, 1999

(87) PCT Pub. No.: WO98/58789
PCT Pub. Date: Dec. 30, 1998

(30) Foreign Application Priority Data

Jun. 23, 1997 (JP) .................................................. 9-165899

(51) Int. Cl.⁷ .................................................. C08G 64/00
(52) U.S. Cl. .......................................... 528/196; 528/198
(58) Field of Search ..................................... 528/196, 198

(56) References Cited

FOREIGN PATENT DOCUMENTS 8175708 7/1996 (JP) .
WO98/58789 * 12/1998 (WO) .

OTHER PUBLICATIONS

PCT/IPEA/409, Feb. 23, 1999, Japan.

* cited by examiner

*Primary Examiner*—Terressa M. Boykin
(74) *Attorney, Agent, or Firm*—Sughrue, Mion, Zinn, Macpeak & Seas, PLLC

(57) ABSTRACT

An aromatic polycarbonate film having excellent transparency and surface smoothness as well as good lubricity useful for optical use through solving the problems of defects such as scratches, wrinkles or abrasions in the production processes and processing processes of the aromatic polycarbonate film for optical use, by specified quality about the concavo-convex forms on both the surfaces of the aromatic polycarbonate film, and by employing specific drying conditions in the drying processes after casting from a solution in a solution-casting film-making method of an aromatic polycarbonate solution.

12 Claims, No Drawings

OPTICAL FILM AND METHOD FOR PRODUCING SAME

TECHNICAL FIELD

The present invention relates to an optical film. More specifically, it relates to a method for producing an aromatic polycarbonate film having optical transparency and excellent lubricity.

BACKGROUND ART

Polycarbonate film comprising an aromatic polycarbonate resin is used as an electrode substrate and a phase difference sheet of a liquid crystal display apparatus due to its high thermal resistance, transparency and optical elastic modulus and so forth. Especially, aromatic polycarbonate film produced by a casting method is preferably used.

In the production of a film poor in lubricity like an aromatic polycarbonate film having a smooth surface, there have been large practical problems during its production. For example, scratches are generated and fine surface-abrasions are formed while the film runs on a transferring roll system. Its poor taking-up property will cause wrinkles to form on the film during the taking-up process, and abrasions to form due to the friction between films when wound too strongly. Therefore, following countermeasures are currently taken for the film having poor lubricity: a lubricant is compounded in the film (for example, Japanese Unexamined Patent Publication No. 8-334607); a surface protecting film having excellent lubricity is laminated on the film; or the film is wound-up with a spacer between films; and so forth. However, when the lubricant is compounded, the formed film will have a critical problem in optical use because of its lowered transparency. On the other hand, the method that uses the surface-protecting film-spacer is accompanied by a production problem, that is, the production process becomes complicated, and the number of the members which are necessary for production is increased.

In order to solve these problems, for example, Japanese Unexamined Patent Publication No. 8-175808 discloses a process for winding up a lubricant-free film which is characterized in that concavo-convex forms are formed on at least one side of the surfaces at both the edges of the film in such a state that the height of the protruding parts is higher than the average height of the film, and subsequently the film is taken up into a roll shape with a winder. In this method, concavo-convex forms are formed on both the edges of a stretched film formed by a melt extrusion method by pushing a rough-surface processing roll which has been internally heated onto the film. However, the film formed by this method is not preferred for optical use because it has defects characteristic of melt extrusion, that is, foreign materials such as heat degradation products or carbonized products. Further, this method has not only a problem of increased energy cost due to the positive heating of the rough-surface processing roll, but also it has such a problem that when the taken-up film having concavo-convex forms at both the edges is taken out from the roll for processing, the surface of the film sometimes unevenly comes into contact with the surface of the transferring roll, and thereby it is sometimes necessary that both the edges having the concavo-convex forms are cut off before processing. Furthermore, both the edges having the concavo-convex forms can not be used as a film of normal quality, and as a result, the waste parts become large.

Thus, the conventional technologies such as the method to achieve the object by improving lubricity of the film by compounding it with a lubricant, or the method in which the film is taken up after concavo-convex forms have been imparted to the edges of the film, still have problems unsolved.

DISCLOSURE OF THE INVENTION

The present invention is proposed in consideration of the above-mentioned current state. The object of the present invention is to solve the problems of the defects such as scratches, wrinkles or abrasions in the production processes of an aromatic polycarbonate film for optical use and in the processing processes of the film, and provide an aromatic polycarbonate film suitable for optical use, excellent in transparency and surface smoothness, and having excellent lubricity.

The inventors of the present invention had pursued studies zealously to solve the above-mentioned problems, and they found that, in a casting method for producing a film from an aromatic polycarbonate solution, concavo-convex forms can be imparted on a surface of the film under specific conditions in a drying process after solution casting, and reached the present invention.

That is, the present invention provides the following aromatic polycarbonate film suitable for optical use and method for producing the film.

1. An optical film characterized in that an aromatic polycarbonate film produced by a solution casting method satisfies the following requirements (a)–(d) at the same time:
   (a) the film is not stretched,
   (b) the haze value of the film is 1.0% or less,
   (c) the central line average surface roughness of one surface of the film is not more than 3 nm, and the central line average surface roughness of the other surface is from 3 to 10 nm., and
   (d) the number of the surface protrusions whose circle equivalent diameters are 30 $\mu$m or more and maximum heights are 3 $\mu$m or more is less than 3 pieces/m$^2$ on any side of the surfaces.

2. An optical film described in the above 1 characterized in that no lubricant is compounded in the film.

3. A method for producing an unstretched optical film characterized in that, when the film is produced by dissolving an aromatic polycarbonate in a solvent, casting the obtained solution onto a support to form film and drying the formed film, the drying process contains a step where the film formed by a solution cast method is dried at the ambient temperature not above (Y+5)° C. to reduce the concentration X of the solvent in the film to the value satisfying the equation: 25% by weight $<X \leq 45\%$ by weight and a step where the film is subsequently kept in contact with the support at the ambient temperature above (Y+5)° C. and not above (Y+35)° C. until the concentration of the solvent in the film becomes 25% by weight, and the holding time of the film in the step where the film is treated at a temperature above (Y+5)° C. and not above (Y+35)° C. is 3 minutes or more (here, Y is the boiling point of the solvent expressed by the centigrade unit).

Here, throughout the present invention, "the boiling point of a solvent" is defined as follows: it means the boiling point of a compound when said solvent consists singly of the compound; it means the boiling point of the compound constituting a main solvent when said solvent consists of the main solvent and an assistant solvent; and it means the boiling point of the compound having the lowest boiling point among the compounds whose weight ratio is more than 10% by weight based on the total of the compounds when said solvent (the main solvent of said solvent when said solvent consists of a main solvent and an assistant solvent) is a mixture of some compounds.

Further, it is preferred that the step where the film is treated at a temperature above $(Y+5)°$ C. and not above $(Y+35)°$ C. (preferably, above $(Y+5)°$ C. and not above $(Y+25)°$ C. is completed in the reaction time not longer than 8 minutes, at most not more than 15 minutes. Furthermore, the aromatic polycarbonate to be used preferably has a viscosity average molecular weight of $3\times10^4$ to $7\times10^4$, and a bisphenol A-polycarbonate polymer having a viscosity average molecular weight of $3\times10^4$ to $7\times10^4$ is more preferred.

4. A method for producing an unstretched optical film described in the above 3 characterized in that the solvent contains methylene chloride in an amount of 95% or more by weight.

Here, the boiling point of methylene chloride is 40° C., and hence $(Y+5)°$ C.=45° C. and $(Y+35)°$ C.=75° C.

5. A method for producing an unstretched optical film described in the above 3 or 4 characterized in that the solvent contains one or two or more selected from methyl alcohol, ethyl alcohol and propyl alcohol in an amount of 5% or less based on the whole of the solvent.

Further, when the solvent contains one or two or more selected from methyl alcohol, ethyl alcohol and propyl alcohol, the content of the selected alcohols is more preferably from 0.1 to 5% by weight.

6. A method for producing an unstretched optical film described in the above 3, 4 or 5 characterized in that the solution obtained by dissolving the aromatic polycarbonate in a solvent is filtered through a filter having an aperture of 0.3 to 30 μm before it is cast on the support.

7. A method for producing an unstretched optical film described in the above 3, 4, 5 or 6 characterized in that the surface of the support has a central line average surface roughness of 1.0 to 3.0 nm and has no scratch of 50 μm or more in the maximum length and of 5 μm or more in the maximum depth.

8. A method for producing an aromatic polycarbonate unstretched film by a solution casting method characterized in that the production method contains processes where the solution is cast on a support into a film and the formed film is dried, and the film surface which is in contact with the support is kept as it is in contact with the support until the surface of the film satisfies the following requirements (e) and (f) at the same time:

(e) the film surface not in contact with the support is in a state where it has a central line average surface roughness of not more than 3 nm, and the number of the surface protrusions of the film whose circle equivalent diameters are 30 μm or more and maximum heights are 3 μm or more is less than 3 pieces/m², and (f) the film surface in contact with the support is in a state where it has a central line average surface roughness in the range of 3 to 10 nm, and the number of the surface protrusions of the film whose circle equivalent diameters are 30 μm or more and maximum heights are 3 μm or more is less than 3 pieces/m².

9. An unstretched optical film which is an aromatic polycarbonate film characterized in that said film is produced by one of the above processes 3 to 8.

10. An optical film which is an aromatic polycarbonate film characterized in that said film is produced by subjecting the unstretched film described in the above 1, 2 or 9 to uniaxial stretching.

11. An optical film described in the above 10 characterized in that, in the conditions of the uniaxial stretching, a stretching ratio is from 1.05 to 3.2 at a stretching temperature of from $(Tg-5)°$ C. to $(Tg+30)°$ C.

Here, Tg means the glass transition temperature of the polycarbonate which forms the film, concretely the value of the unstretched film determined just before the uniaxial stretching. When the solvent of the film is remaining in it, the Tg is determined in a state the solvent is contained.

The reason of setting the temperature of the uniaxial stretching in the rang of $(Tg-5)°$ C. to $(Tg+30)°$ C. is that, when the temperature of the uniaxial stretching is lower than $(Tg-5)°$ C., the stretched film is apt to become cloudy and the transparency is lost, and thereby it can not be used as a film for an optical use, and on the other hand, when the temperature of the uniaxial stretching exceeds $(Tg+30)°$ C., the uniaxial stretching moves to be in a flow stretching state, the orientation of the polymer is hindered, and hence a film having homogeneous optical properties (retardation and the like) can not be obtained. The temperature of the uniaxial stretching is more preferably from $Tg°$ C. to $(Tg+30)°$ C.

The stretching ratio of from 1.05 to 3.2 is needed because stretching ratio in such a range is required to get a retardation value of 100 to 1000 nm, necessary for optical use.

12. A stretched optical film characterized in that an aromatic polycarbonate film produced by a solution casting method satisfies the following requirements (g) to (j) at the same time:

(g) the film is stretched in a uniaxial direction, (h) the haze value of the film is from 0.1 to 8.0%, (i) the central line average surface roughness of one surface of the film is not more than 5 nm, and the central line average surface roughness of the other surface is from 5 to 40 nm, and (j) the number of the surface protrusions whose circle equivalent diameters are 30 μm or more and maximum heights are 3 μm or more is less than 3 pieces/m² on any side of the surfaces of the film.

Further, the haze value of the film after the film formation is preferably 0.1% or more. The surface after the above-mentioned film formation not in contact with the support has a central line average surface roughness preferably of from 1 to 3 nm in an unstretched film and preferably of from 1 to 5 nm in a stretched film. The thickness of the unstretched film after the film formation and drying is preferably from 30 to 200 μm, more preferably from 70–150 μm. The thickness of the stretched film is preferably from 20 to 140 μm and more preferably from 30 to 60 μm.

Here, the reason why the haze value of the film is more preferably 0.1% or more is that the imparting of concavo-convex forms to the surface of the film is somewhat required as will be described later, the concavo-convex forms being assumingly attributable to the crystallization (causing the increase of haze value) of the aromatic polycarbonate in the neighborhood of the film surface which is in contact with the support. In the above 3, the reason why the step where the film is treated at a temperature above $(Y+5)°$ C. and not above $(Y+35)°$ C. (preferably, above $(Y+5)°$ C. and not above $(Y+25)°$ C. is completed in the reaction time of preferably not more than 8 minutes, at most not more than 15 minutes is that, if this step is too long, a large number of aromatic polycarbonate crystals probably through a different mechanism, are formed not only in the neighborhood of the surface parts of the film where the film is in contact with the support but also at other parts, and these crystals fruitlessly elevate the haze of the film. Further, in the above 5, the reason why the total content of the alcohols is preferably 0.1% or more by weight when the solvent contains one or two or more selected from methyl alcohol, ethyl alcohol and propyl alcohol is to ensure the crystallization stimulation effect of these alcohols on aromatic polycarbonate, which effect is explained later. Further, the reason why the film surface not in contact with the support has a central line average surface roughness (Ra) preferably of from 1 to 3 nm in an unstretched film and preferably of from 1 to 5 nm in a stretched film is that, when the Ra is too large, the optical transparency of the film is sometimes insufficient, and when it is too small, the lubricity of the film is sometimes insufficient.

Further, in the above 3 and in the description of the present invention, "ambient temperature" means the temperature of hot air blown upon from below the support or from above the film.

Furthermore, in the description of the present invention, the measurements of a haze value, a central line average surface roughness (Ra), a circle equivalent diameter of a surface protrusion and the maximum height of surface protrusion of the film were carried out according to the following methods (1) to (4).

(1) Haze Value of Film

This was determined according to JIS-K7105.

(2) Central Line Average Surface roughness (Ra)

This was determined according to JIS-B0601.

(3) Circle Equivalent Diameter of Surface Protrusion

The surface of a target film opposite to the surface to be examined was adhered on a clean slide glass with collodion, this was dried for one day, subsequently aluminum vapor was deposited onto the surface to be examined, the deposited surface was observed under an optical microscope with light of 546 nm in wave length by a vertical dark-visual-field method to determine the circle equivalent diameter of the region of a protrusion part (shown by the difference of light and shade).

(4) Maximum Height of Surface Protrusion

The vapor deposited surface of the aluminum vapor deposited sample in the above (3) was examined under a multiple interference microscope or a two-beam interference microscope with a light of 546 nm in wave length to count the number (n) (the interference fringe parts corresponding to the highest part and the lowest part were counted into the number (n)) of interference fringe parts appearing between the highest part (that is, the smallest interference fringe part out of the overlaps of the interference fringes which show protrusions) and the lowest part (that is, the largest interference fringe part out of the overlaps of the interference fringes which show the protrusions) out of the overlaps of the interference fringes appearing due to each surface protrusion, and (n)×0.27 $\mu$m is taken as the maximum height of the surface protrusion.

BEST MODE FOR CARRYING OUT THE INVENTION

Hereafter, the present invention will be explained further in detail.

(A) Aromatic Polycarbonate and Viscosity Average Molecular Weight

The aromatic polycarbonate used in the present invention is not specifically limited as far as it is an aromatic polycarbonate which can produce a film having desired physical properties. A polymer material that is generally called aromatic polycarbonate means a polymer material obtained by polycondensation of a phenol derivative, phosgene, diphenyl carbonate and so forth. Generally, an aromatic polycarbonate expressed by the recurrent unit whose bisphenol component is 2,2-bis(4-hydroxyphenyl)propane, which is called bisphenol A, is preferably selected (in the present invention, the aromatic polycarbonate containing bisphenol A as the bisphenol component is called a bisphenol A polycarbonate). Aromatic polycarbonate copolymers can also be constituted by appropriately selecting other various kinds of bisphenol derivatives together with 2,2-bis(4-hydroxyphenyl)propane.

Examples of such copolymerization component include bis(4-hydroxyphenyl)methane, 1,1-bis(4-hydroxyphenyl) cyclohexane (also called bisphenol Z), 9,9-bis(4-hydroxyphenyl)fluorene (also called bisphenol FL), 1,1-bis (4-hydroxyphenyl)-3,3,5-trimethylcyclohexane, 2,2-bis(4-hydroxy-3-methylphenyl)-2-phenylethane, 2,2-bis(4-hydroxyphenyl)-1,1,1,3,3,3-hexafluoropropane, bis(4-hydroxyphenyl)diphenylmethane, bis(4-hydroxyphenyl) sulfide, bis(4-hydroxyphenyl)sulfone and the like. Further, regarding the carbonate component, a polyester carbonate which contains a terephthalic acid component and/or an isophthalic acid component in a portion of the carbonate component can be used. By substituting portions of the bisphenol A part and the carbonate part thus with other constituting units, properties of the aromatic polycarbonate, for example, heat resistance and solubilities can be improved.

The viscosity average molecular weight of the aromatic polycarbonate of the present invention is preferably not less than 20,000 nor more than 200,000. When the viscosity average molecular weight is less than 20,000, the viscosity of the solution is too low, and as a result, the control of the thickness of membrane is difficult. Further, when the viscosity average molecular weight is more than 200,000, the viscosity of the solution is too high, and as a result, the control of the thickness of membrane is difficult. The especially preferable viscosity average molecular weight is not less than 30,000 nor more than 70,000.

(B) Dissolving Solvent

In the present invention, the solvent used for dissolving the above aromatic polycarbonate is properly selected considering the solubility enabling the preparation of a castable solution viscosity, the stability regarding crystal formation from the obtained solution (crystals being hardly depositing) and the safety in the preparation of a solution (hygienic consideration for a human body).

Examples of the solvent for dissolving the aromatic polycarbonate include a single compound of methylene chloride, 1,3-dioxolan, chloroform, tetrahydrofuran, dioxane, tetrachloroethane or 1,2-dichloroethane, or a mixtures of two or more of these compounds.

Further, it is preferable that an assistant solvent such as methyl alcohol, ethyl alcohol, propyl alcohol (n-propyl alcohol, isopropyl alcohol or their mixture) or butyl alcohol (n-butyl alcohol, isobutyl alcohol or their mixture) singly, or in combination of the two or more are added to a single compound of methylene chloride or 1,3-dioxolan or a mixture of the compounds. Here, the amount of the above-mentioned alcohol(s) is preferably 5% or less by weight, especially preferably 0.1–5% by weight. In the present invention, when the above-mentioned alcohol or a mixture of them is used together with a solvent, the alcohol or the mixture of them is called an assistant solvent, and the solvent other than the assistant solvent is called a main solvent.

(C) Preparation of a Solution

For the preparation of the solution of the present invention, when a solvent is a single compound, pellets of an aromatic polycarbonate are charged into the solvent while it is stirred to dissolve them. When the solvent consists of a main solvent and an assistant solvent, for example, the solvent is a mixture of methylene chloride (the main solvent) and ethyl alcohol (the assistant solvent), the mixed solvent is prepared in advance, and pellets of an aromatic polycarbonate are charged into it under stirring to dissolve them.

Here, the alcohol is used for stimulating the crystallization of the polycarbonate during drying the cast film and ensuring the shape holding property of the film rather than for performing the function as a solvent as it has inherently. Because the alcohol dissolves polycarbonate poorly, when the alcohol is added after dissolving the aromatic polycarbonate, for example, in methylene chloride as the main solvent, the aromatic polycarbonate is apt to be crystallized to make the solution cloudy. When the alcohol is added until the solution becomes cloudy, the haze of the film obtained by casting and drying often becomes undesirably too high. From these reasons, when the main solvent and the assistant solvent are used, pellets of the aromatic polycarbonate are preferably charged into the mixed solvent prepared in advance. Further, both in the case where the aromatic polycarbonate is dissolved in the main solvent, and subsequently the assistant solvent is added to the solution, and in the case where the aromatic polycarbonate is charged into the mixed solvent of the main solvent and the assistant solvent, the amount of the assistant solvent is preferably suppressed in such a manner that the solution does not become cloudy.

The amount of the assistant solvent to be added into the main solvent can be determined by trial-and-error with the investigation of the crystallization behavior of the solution (the degree of cloudiness). The ratio of the addition of the alcohol is desirably 5% or less by weight. When the ratio of the addition of the alcohol exceeds 5% by weight, the haze of the film becomes too high. Further desirably, the ratio is not less than 0.1% and not more than 5% by weight. This is because, when the ratio of the addition of the alcohol is less than 0.1% by weight, the crystallization of the polycarbonate during the drying, which is expected by the present invention, is hardly occur, and thereby, the film forming conditions are sometimes limited.

Further, since the assistant solvent is used for accelerating the crystallization during the drying of the film prepared by solution casting as mentioned above, this purpose is hardly achieved when the evaporation rate of the assistant solvent is larger than that of the main solvent. Therefore, the boiling point of the alcohol to be used is preferably at least somewhat higher than that of the main solvent. When the main solvent is a mixture, the boiling point of the alcohol to be used is preferably higher than that of the compound having the lowest boiling point among the compounds whose weight ratios are more than 10% by weight of the total of the compounds constituting the main solvent. From the results of various experiments, it has become clear that the case where the difference between the boiling point of the main solvent (when the solvent is a mixture, the compound having the lowest boiling point among the compounds whose weight ratios are more than 10% by weight of the total of the compounds constituting the main solvent) and that of the assistant solvent is 2° C. or more, preferably 5° C. or more is suitable for imparting concavo-convex forms to the surface of the film, which is the object of the present invention and probably attributable to the crystal deposition.

The concentration of the aromatic polycarbonate in the solution to be used for the solution casting is set preferably at from 10 to 25% by weight. When the concentration of the aromatic polycarbonate in the solution is less than 10% by weight, the load for drying the solution-cast film is too heavy so that the obtaining of a film good in flatness becomes extremely difficult. On the other hand, when it exceeds 25% by weight, if the molecular weight of the aromatic polycarbonate is large, the viscosity of the solution is too high, and as a result, the control of the thickness of the film is difficult, and if the molecular weight of the aromatic polycarbonate is small, the evaporation of the solvent in the initial period of the evaporation gives bad effect on the surface flatness of the film, and thus these concentrations are not suitable. More preferable concentration is from 15% to 20% by weight.

The solution is filtered with a commercial filter for removing dusts, gel materials or the like. It has been found that the average aperture of the filter element to be used is preferably from 0.3 to 30 $\mu$m. Several filters having different apertures can be used in combination.

Temperature fluctuation of the solution just before casting should preferably be kept as little as possible in order to suppress the fluctuation in the behavior of the evaporation of the solvent in the following steps. It has been found that it is preferable to control, with heating (or cooling), the temperature of the solution within ±0.5° C. in a usual case, for example, when it is set at 15° C.

(D) Casting and Drying

It is not preferable for the prevention of the quick evaporation of the solvent from liquid state membrane or film that the temperature of the aromatic polycarbonate solution which has been cast is too much higher than the boiling point of the solvent at the initial stage of the drying. In the present invention, the solution is cast through a die onto a support under an environment whose temperature is controlled at (Y+5° C.) or less, preferably in the range of 5° C. to (Y+5° C.) where the boiling point of the solvent is expressed by Y. The temperature is further preferably (Y° C.) or less, further more preferably from 5° C. to (Y° C.).

As the support, glass, stainless steel, a ferrotype board, or in some case a plastic film such as polyethylene terephthalate or polyethylene 2,6-naphthalate can be used.

Industrially, a support made of an endless metal board is commonly used. For the purpose of the present invention, an endless metal board support is desirable to obtain stable concavo-convex forms on the film surface. The thickness of the film is controlled by the degree of the opening of the above-mentioned die. In addition, an ordinary thick-coating method such as a doctor blade sweeping method or a reverse roll coater method can be used. The most preferable one is a method in which the solution is cast through an extruding die onto an endless metal belt. In the present invention, "film" means a material of all states ranging from an liquid membrane cast through a die to an ordinary so-called film in a solid state formed by removing the solvent.

It has been turned out that the support which is used for casting the aromatic polycarbonate on is preferably prepared by mirror polish and has physical properties having a central line average surface roughness (Ra) of from 1.0 to 3.0 nm and free from a scratch of the maximum length of 50 $\mu$m or more and the maximum depth of 5 $\mu$m or more. In the case where the surface state is out of these ranges, the lubricity of the film is insufficient when the surface of the support is smoother, and on the other hand the roughness on the surface of the film attributable to the roughness of the surface of the support is generated in addition to the concavo-convex form formation on the surface of the film which seems to be attributable to the crystallization so that the roughness on the film as a whole unpreferably exceeds the desired level, when the surface of the support is rougher. The reason why the lubricity of the film is insufficient when the surface of the support is smooth seems to be due to the suppression of the generation of seeds which is the start of the crystallization.

Commonly, the purpose of drying the film after casting is to evaporate the large amount of the solvent in a short time without deforming the shape of the film. It is necessary to pay sufficiently attention on drying speed-controlling factors such as drying temperature and air flow rate since the quick evaporation of the solvent causes undesirable phenomena (such phenomena are called leveling failures) such as foaming from a liquid membrane surface or a film surface, or film deformation which exacerbates the unevenness of thickness of the film. Usually, at the initial stage of drying, the film is dried at a temperature lower than the boiling point of the solvent or not so much higher than that, and after a certain amount of the solvent has evaporated, the drying temperature is elevated, and finally heat drying is continued until the concentration of the solvent becomes 20% or less by weight, preferably 15% or less by weight, and then the semidried film is stripped from the support.

It is turned out that, in the drying processes after casting according to the present invention, it is extremely important to control the drying conditions so that the fine surface concavo-convex forms are adequately formed in order to obtain an aromatic polycarbonate film optically transparent and excellent in lubricity which is the object of the present invention, since the crystallization (presently this is assumed as a phenomenon in which the aromatic polycarbonate crystallizes from the solution) occurs at the surface layer which is in touch with the support out of the surfaces of the cast film, causing the roughness of the surface. When a solvent is decreased by drying, the concentration of polycarbonate in a film increases, and generally speaking the crystallization starts when the concentration becomes at a specified level or higher. But, when the film was dried on the support, it was unexpectedly found that there are drying conditions under which the haze of the film is not increased so much, and at the same time fine concavo-convex forms are formed on the surface of the film in contact with the support, and the other surface of the film not in contact with the support can be kept smooth.

It is considered at present that the concavo-convex forms on the surface of the film are caused by the crystallization of the aromatic polycarbonate. However, considering the fact that the crystallization is accelerated under a condition in which contact of the film surface with the support should suppress the evaporation of solvent, and the fact that the crystallization is not particularly affected by the thickness of the film, it is possible that the contact to the support itself contributes to the occurrence of crystals on the surface (in a sense that the support is apt to generate seed crystals of the aromatic polycarbonate), and consequently contributes to the formation of the concavo-convex forms on the surface. Further, when the alcohol is used as the assistant solvent, comparing with the surface which is not in contact with the support, the surface which is in contact with the support has no evaporation of the assistant solvent, accordingly the concentration of the assistant solvent relatively increases as the concentration of the main solvent decreases, and it is considered that this situation also contributes to the formation of the concavo-convex forms on the surface.

The occurrence of the formation of the concavo-convex forms on the surface, which may be due to crystallization, during the drying process after casting may be affected by the factors such as the concentration of the aromatic polycarbonate in the solvent, the concentration of the assistant solvent, the temperature on the time of the crystallization and the length of time (the retention time) to be exposed to the temperature, in said surface layer of the film. Then, the inventors of the present invention studied the crystallization behavior on the surface layer of the cast film during drying, and found that, when a film is produced by dissolving an aromatic polycarbonate in a solvent, casting the obtained solution onto a support and drying it, the film surface suitable for the aromatic polycarbonate film of the present invention, which has optical transparency and excellent lubricity, is obtained if the process, which is carried out after a film is formed by casting, comprises a first stage, where the film is dried at the ambient temperature of $(Y+5)°$ C. or less (preferably, $Y°$ C. or less), when the boiling temperature of the solvent is taken as $Y$, to reduce the concentration $X$ of the solvent in the film to the value satisfying the equation: 25% by weight$<X \leq 45$% by weight, and subsequently a second stage, where the film is kept in contact with the support at the ambient temperature above $(Y+5)°$ C. and not above $(Y+35)°$ C. preferably, above $(Y+5)°$ C. and not above $(Y+25)°$ C. until the concentration of the solvent in the film becomes 25% by weight, and the holding time of the film in the step where the film is treated at said temperature above $(Y+5)°$ C. and not above $(Y+35)°$ C. preferably, above $(Y+5)°$ C. and not above $(Y+25)°$ C.)) is 3 minutes or more.

Thus, the inventors of the present invention found the followings: when the obtained solution is cast onto the support to form the film, and the obtained film is dried by holding it at the ambient temperature of $(Y+5)°$ C. or less (preferably, $Y°$ C. or less) to dry until the concentration $X$ of the solvent, etc. in the film becomes to satisfy the equation: 25% by weight $<X \leq 45$% by weight, no defects due to the foaming of the solvent in the film appears in the film and the aromatic polycarbonate substantially does not crystallize in the film including the surface in contact with the support; and when the film is held for 3 minutes or more subsequently in the step where the film is held in a state where it is in contact with the support at the ambient temperature above $(Y+5)°$ C. and not above $(Y+35)°$ C. (preferably, above $(Y+5)°$ C. and not above $(Y+25)°$ C.) until the concentration of the solvent in the film becomes 25% by weight, concavo-convex forms can be imparted to the surface of the film, which seems to be attributable to the crystallization of aromatic polycarbonate near the film surface in contact with the support, thereby the concavo-convex forms, which gives excellent lubricity, can be imparted to the surface of the film while avoiding the problem of haze increasing due to the crystallization of the aromatic polycarbonate inside the film, at the same time, thereby the crystallization of the aromatic polycarbonate in the film substantially no longer proceeds in the following drying processes, and therefore no problem of the more increase of haze occurs. For example, when 97% methylene chloride by weight and 3% ethyl alcohol by weight are used, the film is treated at 45° C. (preferably, 40° C.) in the first stage, and at a temperature above 45° C. and not above 75° C. (preferably, above 45° C. and not above 65° C.) in the second stage since the boiling point of methylene chloride is 40° C.

Further, they found that it is preferable for the aromatic polycarbonate to have the viscosity average molecular weight of $3 \times 10^4$ to $7 \times 10^4$ in this case. It is considered that when the viscosity average molecular weight is above $7 \times 10^4$, the speed of crystallization lowers probably due to its high viscosity, and when it is below $3 \times 10^4$, the trouble of leveling failure is apt to occur due to its low viscosity.

Furthermore, they also found that when a bisphenol A polycarbonate polymer is used as the aromatic polycarbonate, the aromatic polycarbonate film of the present invention, which is optically transparent and excellent in lubricity, can be obtained in a shorter time and with stable quality. This is probably due to the chemical structure of bisphenol A polycarbonate polymer having good symmetry and the above-mentioned effect of the viscosity.

Subsequently, the film is cooled to an adequate temperature in the third stage, and transferred to a peeling process of the fourth stage. Generally, considering efficiency in solvent removal and workability, drying is further continued in the third stage until the concentration X of the solvent satisfies the equation: 15% by weight≦X<25% by weight.

(E) Peeling Process and Subsequent Processes

As mentioned above, the cooled film is peeled from the support in the peeling process of the fourth stage.

Subsequently, the film is treated by the main drying process until the content of the solvent is reduced generally below several percents by weight. This process is generally carried out continuously from the preceding process, but the film can be subjected to the main drying process after it has been once wound up.

The peeling process and the main drying process can be carried out according to generally known methods, and the film which is suited for a substrate for liquid crystal or the like can be produced under control of optical properties (retardation, refractive index and the like) by using a pin tenter-type dryer, a roll suspension-type dryer, an air floating-type dryer or the like. The so-obtained film may be optionally subjected to uniaxial or biaxial stretching to convert it to a phase difference film for a liquid crystal display apparatus.

Physical properties of the surfaces of the film obtained by the above-mentioned treatments were studied in detail, and resultingly it was found that the optical film for the usage of the present invention is good when all of the following requirements (a) to (d) are satisfied:

(a) the film is not stretched, (b) the haze value of the film is 1.0% or less, (c) the central line average surface roughness of one surface of the film is not more than 3 nm, and the central line average surface roughness of the other surface is from 3 to 10 nm and (d) the number of the surface protrusions whose circle equivalent diameters are 30 μm or more and maximum heights are 3 μm or more is less than 3 pieces/m² on any side of the surfaces, or all of the following (g) to (j) are satisfied:

(g) the film is stretched in a uniaxial direction, (h) the haze value of the film is from 0.1 to 8.0%, (i) the central line average surface roughness of one surface of the film is not more than 5 nm, and the central line average surface roughness of the other surface is from 5 to 40 nm and (j) the number of the surface protrusions whose circle equivalent diameters are 30 μm or more and maximum heights are 3 μm or more is less than 3 pieces/m² on any side of the surfaces of the film, and further the haze value of the film is more preferably 0.1% or more.

That is, they found that when haze value is over 8.0%, the transparency for the optical film in the usage of the present invention is insufficient, on the other hand, the smaller the haze value is, the better the film is, and the film having haze value especially of 1% or less is in great need in optical usage. They also found that it is preferable to have the haze practically of 0.1% or more in order to secure necessary amount of concavo-convex forms on the surface since it is needed to give a certain amount of the concavo-convex forms that is believed to be attributable to the crystallization of the aromatic polycarbonate in order to obtain adequate amount of concavo-convex forms on the surface of the film, and there is increasing of haze accompanied by the crystallization. Further, the reason why the central line average surface roughness (Ra) of one surface and the central line average surface roughness (Ra) of the other surface are each needed to be in a specific range is that a certain level of Ra is needed for giving adequate lubricity to the film, while, when the value is too large, the surface of the film is too rough, and the haze of the film is too high for the optical film. Regarding the side of the film that is not the roughened surface, the smoother it is, the better the film is for the primary purpose of the optical use, but it is preferred that also this side is roughened at a certain level to secure the lubricity between films.

Having the requirements both of securing of lubricity and flatness for optical use in mind, the inventors of the present invention studied both the unstretched film and the stretched film, and found that the above-mentioned ranges are excellent for the optical film.

Further, the reason why the number of the surface protrusions whose circle equivalent diameters are 30 μm or more and maximum heights are 3 μm or more is less than 3 pieces/m² is that when the film having such large protrusions is used, for example, as a substrate film for a liquid crystal display apparatus, the film-shaped electrode which is formed on the surface of the film can be disconnected at the large protrusion part, and the function as an electrode substrate film can be decreased.

As a result of the study in the present invention, it has become clear that such film surface is obtained by a film forming method of an unstretched aromatic polycarbonate film by a solution casting method characterized in that the method is a film forming method by a solution casting method for producing an aromatic polycarbonate film, the method comprises processes where the solution is cast on a support into a film and the obtained film is dried, and the surface in contact with the support out of the surfaces of the film is kept as it is in contact with the support until the surface of the film becomes to satisfy the following requirements (e) and (f) at the same time:

(e) the surface not in contact with the support out of the surfaces of the film is in a state where it has a central line average surface roughness of not more than 3 nm, and the number of the surface protrusions of the film whose circle equivalent diameters are 30 μm or more and maximum heights are 3 μm or more is less than 3 pieces/m², and (f) the surface in contact with the support out of the surfaces of the film is in a state where it has a central line average surface roughness in the range of 3 to 10 nm, and the number of the surface protrusions of the film whose circle equivalent diameters are 30 μm or more and maximum heights are 3 μm or more is less than 3 pieces/m².

That is, the film surface having excellent lubricity of the present invention is largely influenced, as mentioned above, by the concavo-convex forms that is believed to be attributable to the crystallization of the aromatic polycarbonate occurring in the state where the film is in contact with the support. Here the central line average surface roughness (Ra) of the film surface in contact with the support is the value determined after the film has been peeled off the support.

The film of the present invention, which is an undrawn (or unstretched) film or a stretched film, has an adequate degree of fine roughness on one side of the surfaces, and troubles such as the transference of a roll surface pattern or scratches sometimes generated by the uneven slip of the film on the surface of a roll are extremely hard to occur especially when the film is made to run with transfer rolls, pass through transfer rolls during various treatments before stretching, or else. In addition, when the film is relatively thick, the taking-up of the film can be carried out without using a supplementary means for roll taking-up such as knurling or co-winding with a masking film, etc.

As explained above, the film of the present invention can be used not only as an unstretched film but also as a stretched film. Resultingly, the stretched film has advantages that the film is excellent in lubricity and is not suffered from abrasions or wrinkles by transfer rolls, even though it is thinner in thickness.

EXAMPLES

The present invention will be explained in detail hereafter with examples, but it is not limited by them. Physical properties in the examples or in the description of the present invention were determined according to the following measuring methods.

(1) Measurement of Surface Roughness (Ra)

The central line average surface roughness (Ra) is the value defined by JIS-B0601, and the values shown in the description of the present invention were determined by using a needle-contacting type surface roughness tester (Surfcoder SE-30C, supplied by Kosaka Laboratories Ltd.).

Ra-values of the surfaces of the film and the surface of the support were determined according to the method. Conditions for measuring were as follows.

Needle top radius: 2 μm

Measurement pressure: 30 mg

Cut-off: 0.08 mm

Measurement length: 1.0 mm

Data arrangement: one sample was measured repeatedly to obtain five values (the value down to the fourth decimal place and expressed by μm unit), the largest value was omitted, then the average of the remaining four values was rounded at the fifth decimal place, and the value down to the fourth decimal place was expressed by nm unit.

(2) Viscosity Average Molecular Weight

The intrinsic viscosity $[\eta]$(g/dl) of an methylene chloride solution at 20° C. was determined by using an Ubbellohde viscometer, and the viscosity average molecular weight Mv was calculated by the following equation (Schnell method). $[\eta]=1.23 \times Mv^{0.83}$ (3) Solvent Concentration About 5 g of a film sample was weighed with a chemical balance, subsequently dried in a hot air drying furnace at 170° C. for one hour, then cooled to room temperature and weighed again. The value: (the weight before drying−the weight after drying)×100/(the weight before drying) was taken as the solvent concentration (% by weight). Further, in the description of the present invention, the concentration means the mean value determined by neglecting the concentration gradient on the cross section of the sample unless it is otherwise specified.

Further, in the description of the present invention, the concentration of aromatic polycarbonate means (100−the above-described solvent concentration) (% by weight).

(4) Haze

The haze of a film was determined by a turbidimeter (Model COH-300A) supplied by Nippon Densyoku Co., Ltd.

(5) Observation and Measurement of Protrusions of the Film

Ten cut-sheets of A-4 size were randomly cut out from a film, and the measurements on surface protrusions were carried out by determining the circle equivalent diameter and the maximum height of a surface protrusion by the methods described in the description of the present specification. Here, the maximum heights of the surface protrusions were measured by using a two-beam interference microscope. The number of the surface protrusions was expressed in terms of the number per square meter.

(6) Observation of Scratches on the Surface of the Film

A sample of 1.5 m long in the longitudinal direction was taken out from a roll of film taken-up. The film was attached on a scratch-testing table with a blackout curtain, and the presence of scratches were detected with a reflection light of a Cadnica light illuminating the film at an angle.

Example 1

A polycarbonate resin (Panlite® grade C-1400QJ supplied by Teijin Chemicals Ltd., viscosity average molecular weight of 38,000) was dissolved in methylene chloride to prepare a solution of 18% by weight.

The solution was passed through a filter (a filter supplied by Advantec Co., Ltd., trade name of Depthcartridge filter, TCPD-05A, average hole diameter of 0.5 μm) to remove foreign matters. Further, after the temperature of the solution was adjusted to 15±0.5° C., the solution was introduced into a 500 mm wide coat hanger die, and subsequently it was cast on a stainless steel-made support whose surface had a central line average surface roughness (Ra) of 1.8 nm, and was free from scratch having the maximum length of 50 μm or more and the maximum depth of 5 μm or more into a film of about 780 μm thick. The surface temperature of the support directly before the start of casting was set at 5° C. The cast film was dried as follows. Here, the support itself had no temperature controlling function, and said 5° C. was set by controlling the temperature of the hot air or cool air blown from outside onto the support.

(The first stage) At the initial stage of drying, by blowing warm air of 30° C. onto the backside of the support to heat it, the ambient temperature of the film was brought to 26° C., and the film was dried for 6 minutes. This process corresponds the pretreatment for realizing concavo-convex forms on the surface of the film of the present invention. The solvent concentration at the end point of this stage was 38% by weight. The above conditions are necessary to prevent the occurrence of deformation (leveling failure) in the film.

(The second stage) Subsequently, the backside of the support and the film were heated for drying by warm air at the ambient temperature of 50° C. for 4 minutes and subsequently of 60° C. for 3 minutes to make the solvent concentration of the film 25% by weight. This process is for the realization of concavo-convex forms on the surface of the film of the present invention.

(The third stage) Subsequently, the film was cooled in the air of 15° C. for 4 minutes. The concentration of the solvent at the end point of the stage was 20% by weight.

(The fourth stage) The above film was peeled off the support. The peeled film was further subjected to the main drying by a pin tenter-type dryer and a roll suspension-type dryer, and the dried film was taken-up into a roll shape. The solvent concentration after the main drying was 0.5% by weight.

The physical properties of the so-obtained film were as follows: the thickness of the film was 140 μm; the central line average surface roughnesses (Ra) of the film were 8.0 nm at the side in contact with the support and 2.0 nm at the side not in contact with the support; the haze value of the film was 0.6%; and the number of the surface protrusions whose circle equivalent diameters were 30 μm or more and maximum heights were 3 μm or more was 2 pieces/m². Neither scratches nor wrinkles due to the slipping failure of the film occurred in the above processes, and the occurrence of scratches or wrinkles was not observed at all in the subsequent processes of rewinding and taking out until the film was used as an electrode substrate or a phase difference sheet for a liquid crystal display apparatus.

As shown above, the aromatic polycarbonate film obtained by the present invention was excellent in optical transparency and taking up property, and exhibited excellent function especially as an electrode substrate or a phase difference sheet for a liquid crystal display apparatus.

Comparative Example 1

Casting, drying, peeling-off and the main drying were carried out in the same manner as in Example 1 excepting that the drying conditions in the second stage were changed as follows, with the result that a film 140 μm thick was obtained.

That is, the drying conditions in the second stage was changed so that the concentration of the solvent in the film was reduced to 25% by weight by drying it for 3 minutes at the ambient temperature of 78° C. by blowing hot air.

The so-attained concentration of the solvent at the ending point of the third stage was 16% by weight, and the physical properties of the finally produced film were as follows: the central line average surface roughnesses (Ra) of the film were 2.3 nm at the side in contact with the support and 2.0 nm at the side not in contact with the support; the haze value of the film was 0.3%; and the number of the protrusions was 2 pieces/m². These results are probably that the drying speed was too high, and therefore sufficiently large crystals of the polycarbonate were not generated near the film surface in contact with the support.

Scratches due to the slipping failure were formed in the film. This film was poor in quality as a film for optical use, and could not be used as an electrode substrate for a liquid crystal display apparatus or a phase differential sheet.

Comparative Example 2

Casting, drying, peeling-off and the main drying were carried out in the same manner as in the Example 1 excepting that the drying conditions in the second stage were changed as follows, with the result that a film of 140 μm thick was obtained.

That is, the drying conditions in the second stage were changed so that the concentration of the solvent in the film was reduced to 25% by weight by drying it for 10 minutes at the ambient temperature of 32° C. and subsequently for 3 minutes at 42° C. by blowing hot air.

The so-attained concentration of the solvent at the end point of the third stage was 18% by weight, and the physical properties of the finally produced film were as follows: the central line average surface roughnesses (Ra) of the film were 2.2 nm at the side in contact with the support and 2.0 nm at the side not in contact with the support; the haze value of the film was 0.3%; and the number of the protrusions was 2 pieces/m². These results are probably that the drying speed was too low on the contrarily to Comparative Example 1, and therefore sufficient crystals of the polycarbonate were not generated near the film surface in contact with the support.

Scratches due to the slipping failure were formed in the film. This film was poor in quality as a film for optical use, and could not be used as an electrode substrate for a liquid crystal display apparatus or a phase differential sheet.

Example 2

A bisphenol A polycarbonate having a viscosity average molecular weight of 60,000 was prepared and a mixed solvent was produced by compounding methylene chloride with ethyl alcohol in an amount of 2.0% by weight. The polymer was dissolved in the mixed solvent to produce a solution having a concentration of 18% by weight. The solution was filtered in the same manner as in Example 1, and cast onto the same support as the support shown in Example 1 in such a manner as to produce a cast film of 690 μm thick. The temperature (surface temperature) of the support directly before the start of casting was set at 8° C. The cast film was dried as follows.

(The first stage) At the initial stage of drying, by blowing warm air of 35° C. onto the backside of the support, the ambient temperature of the film was brought to 25° C., and the film was dried cautiously not to cause deformation of the film for 4 minutes until the film became resistant to the deformation (leveling failure) of the film. The solvent concentration at the end point of the stage was 42% by weight.

(The second stage) The ambient temperature was controlled by warm air for drying the film at 50° C. for 4 minutes and subsequently at 60° C. for 2 minutes to make the concentration of the solvent in the film 25% by weight.

(The third stage) The film was cooled for 2.5 minutes in the air of 15° C. The solvent concentration at the end point of the stage was 20% by weight.

(The fourth stage) The above film was peeled off the support. The peeled film was further dried by a pin tenter-type dryer and a roll suspension-type dryer.

Subsequently, the film was preheated in an air floating-type heater at 175° C., and then the film was uniaxially stretched at a stretching ratio of 2.8 in the running direction at a stretching temperature of 180° C. and wound-up into a roll. The thickness of the film was 45 μm. The solvent concentration in the wound film was 0.5% by weight. Further, the Tg determined directly after the preheating and directly before the stretching was 158° C.

Physical properties of the so-obtained film are as shown in Table 1.

TABLE 1

| Example & Comparative Example | Viscosity average molecular weight | Central line average surface roughness (nm) *1 | Central line average surface roughness (nm) *2 | Occurrence of surface failure (scratch) | Number of surface protrusions (piece/m$^2$) *3 | Haze value (%) |
|---|---|---|---|---|---|---|
| Example 2 | 60,000 | 2.5 | 7.0 | no | 1 | 1.0 |
| Example 3 | 38,000 | 2.5 | 5.0 | no | 1 | 0.4 |

Note:
*1 The value of the surface not in contact with the support.
*2 The value of the surface in contact with the support.
*3 The number of the protrusions having the circle equivalent diameter of 30 μm or more, and the maximum height of 3 μm or more out of the protrusions on the surface of the film.

As shown in Table 1, the uniaxially stretched aromatic polycarbonate film of the present invention was excellent in optical transparency, had an extremely small number of surface failures, was almost free from the occurrence of fine scratches even when coming into contact with a film-forming roll system, and accordingly was excellent in taking-up properties; and it exhibited excellent function especially as a phase difference film for a liquid crystal display apparatus.

Example 3

An aromatic polycarbonate resin (Panlite® grade C-1400QJ supplied by Teijin Chemicals Ltd., viscosity average molecular weight of 38,000) was dissolved in an ethanol-methylene chloride mixed solvent (3.0 wt. % ethanol and 97.0 wt. % methylene chloride by weight) to prepare a solution of 18% by weight.

The solution was filtered through the same filter as in Example 1 to remove foreign matters. Further, after the temperature of the solution was adjusted to 15±0.5° C., the solution was introduced into a 1500 mm wide coat hanger die, and subsequently it was cast on a stainless steel-made support whose surface had a central line average surface roughness of 1.8 nm, and was free from scratch having the maximum length of 50 μm or more and the maximum depth of 5 μm or more into a film about 420 μm thick. The surface temperature of the support directly before the start of casting was set at 9° C.

The cast film was dried as follows.

(The first stage) At the initial stage of drying, by blowing warm air of 45° C. onto the backside of the support, the ambient temperature of the film was brought to 20° C. for drying the film cautiously not to cause deformation of the film for 4 minutes until the film became resistant to the deformation (leveling failure) of the film. The solvent concentration at the end point of this stage was 30% by weight.

(The second stage) Subsequently, by blowing warm air, the film was dried for 2.8 minutes at the ambient temperature of 50° C. and subsequently for 2 minutes at 60° C. to make the solvent concentration in the film 25% by weight.

(The third stage) The above film was cooled in the air of 15° C. for 2.8 minutes. The concentration of the solvent at the end point of the stage was 17% by weight.

(The fourth stage) The above film was peeled off the support. The peeled film was further dried by a pin tenter-type dryer and a roll suspension-type dryer.

Subsequently, the film was preheated in an air floating-type heater at 155° C., then the film was uniaxially stretched at a stretching ratio of 1.28 in the running direction at a stretching temperature of 160° C. and wound-up into a roll through a masking tape overlaying. The thickness of the film was 58 μm. The solvent concentration in the wound film was 0.5% by weight.

Physical properties of the so-obtained film of the present invention are as shown in Table 1, and the film was free from scratch due to the slipping failure, and had excellent optical transparency and winding properties. In addition, the Tg determined directly after the preheating and directly before the stretching was 135° C.

Example 4

An aromatic polycarbonate resin (Panlite® grade C-1400QJ supplied by Teijin Chemicals Ltd., viscosity average molecular weight of 38,000) was dissolved in an ethanol-methylene chloride mixed solvent (3.0 wt. % ethanol and 97.0 wt. % methylene chloride by weight) to prepare a solution of 18% by weight.

The solution was filtered through the same filter as in Example 1 to remove foreign matters. Further, after the temperature of the solution was adjusted to 15±0.5° C., the solution was introduced into a 1500 mm wide coat hanger die, and subsequently it was cast on a stainless steel-made support whose surface had a central line average surface roughness of 1.8 nm, and was free from scratch having the maximum length of 50 μm or more and the maximum depth of 5 μm or more into a film about 670 μm thick. The surface temperature of the support directly before the start of casting was set at 9° C.

The cast film was dried as follows. Here, the support itself had no temperature controlling function, and said 5° C. was set by controlling the temperature of the hot air or cool air blown from outside onto the support.

(The first stage) At the initial stage of drying, by blowing warm air of 30° C. onto the backside of the support to heat it, the ambient temperature of the film was brought to 26° C., and the film was dried for 6 minutes. This process corresponds the pretreatment for realizing concavo-convex forms on the surface of the film of the present invention. The solvent concentration at the end point of this stage was 36% by weight. Further, the above conditions are necessary to prevent the occurrence of deformation (eveling failure) in the film.

(The second stage) Subsequently, the backside of the support and the film were heated for drying by warm air at the ambient temperature of 48° C. for 4 minutes and subsequently at 57° C. for 3 minutes to make the solvent concentration of the film 24% by weight. This process is for the realization of concavo-convex forms on the surface of the film of the present invention.

(The third stage) Subsequently, the film was cooled in the air of 15° C. for 4 minutes. The solvent concentration at the end point of the stage was 20% by weight.

(The fourth stage) The above film was peeled off the support. The peeled film was further subjected to the main drying by a pin tenter-type dryer and a roll suspension-type dryer. The solvent concentration in the film after the main drying was 1.6% by weight.

The physical properties of the so-obtained film were as follows: the thickness of the film was 120 µm; the central line average surface roughnesses (Ra) of the film were 3.2 nm at the side in contact with the support and 1.7 nm at the side not in contact with the support; the haze value of the film was 0.7%; and the number of the protrusions whose circle equivalent diameters were 30 µm or more and maximum heights were 3 µm or more was 2 pieces/m$^2$. Neither scratches nor wrinkles due to the slipping failure of the film occurred in the above processes.

Subsequently, the film was preheated in an air floating-type heater at 175° C., and then the film was uniaxially stretched at a stretching ratio of 2.75 in the running direction at a stretching temperature of 180° C. Subsequently, the film was allowed to come into contact with a cooling roll to cool down to room temperature and wound-up into a roll-shape. The Tg determined directly after the preheating and directly before the stretching was 155° C.

The thickness of the wound-up film was 44 µm, and the solvent. concentration of the film was 0.2% by weight.

The physical properties of the so-obtained stretched film were as follows: the central line average surface roughnesses (Ra) of the film were 28.0 nm at the side in contact with the support and 5.0 nm at the side not in contact with the support; the haze value of the film was 5.0%; the number of the protrusions whose circle equivalent diameters were 30 µm or more and maximum heights were 3 µm or more was 0.5 pieces/m$^2$. Neither scratches nor wrinkles due to the slipping failure of the film occurred in the above stages.

The occurrence of scratches or wrinkles was not observed at all in the processes of rewinding and taking up until the film was used as an electrode substrate or a phase difference sheet for a liquid crystal display apparatus.

As shown above, the aromatic polycarbonate film obtained by the present invention was excellent in optical transparency and taking-up property, and exhibited excellent function especially as an electrode substrate or a phase difference sheet for a liquid crystal display apparatus.

INDUSTRIAL FIELD OF APPLICATION

The film of the present invention has fine concavo-convex forms on one side of the surfaces, which fine concavo-convex forms do not cause the loss of transparency of the film and give excellent lubricity, and the film exhibits excellent function for optical use. This film is especially useful for optical film use, that is, as various base films such as a film for an electrode substrate, a stretched film for a phase difference sheet, or an unstretched film on which liquid crystals are applied and used.

What is claimed is:

1. An optical film characterized in that the aromatic polycarbonate film produced by a solution casting method satisfies the following requirements (a)–(d) at the same time;
   (a) the film is not stretched,
   (b) the haze value of the film is 1.0% or less,
   (c) the central line average surface roughness of one surface of the film is not more than 3 nm, and the central line average surface roughness of the other surface is from 3 to 10 nm, and
   (d) the number of the surface protrusions whose circle equivalent diameters are 30 µm or more and maximum heights are 3 µm or more is less than 3 pieces/m$^2$ on any side of the surfaces.

2. An optical film described in claim 1 characterized in that no lubricant is compounded in the film.

3. A method for producing an unstretched optical film characterized in that, when the film is produced by dissolving an aromatic polycarbonate in a solvent, casting the obtained solution onto a support to form a film and drying the formed film, the drying process contains a step where the film which has been formed by a solution cast method is dried at the ambient temperature not above (Y+5)° C. to reduce the concentration X of the solvent in the film to a value satisfying the equation: 25% by weight <X≦45% by weight and a step where the film is subsequently kept in contact with the support at the ambient temperature above (Y+5)° C. and not above (Y+35)° C. until the concentration of the solvent in the film becomes 25% by weight, and the holding time of the film in the step wherethe film is treated at a temperature above (Y+5)° C. and not above (Y+35)° C. is 3 minutes or more (here, Y is the boiling point of the solvent expressed by centigrade unit).

4. A method for producing an unstretched optical film described in claim 3 characterized in that the solvent contains methylene chloride in an amount of 95% or more by weight.

5. A method for producing an unstretched optical film described in claim 3 or 4 characterized in that the solvent contains one or two or more selected from methyl alcohol, ethyl alcohol and propyl alcohol in an amount of 5% or less by weight based on the whole of the solvent.

6. A method for producing an unstretched optical film described in claim 3, 4 or 5 characterized in that the solution obtained by dissolving the aromatic polycarbonate in a solvent is filtered through a filter having an aperture of 0.3 to 30 µm before it is cast on the support.

7. A method for producing an unstretched optical film described in claim 3, 4, 5 or 6 characterized in that the surface of the support has a central line average surface roughness of 1.0 to 3.0 nm and has no scratch of 50 µm or more in the maximum length and of 5 µm or more in the maximum depth.

8. A method for producing an aromatic polycarbonate unstretched film by a solution casting method characterized in that the aromatic polycarbonate film is formed by a solution casting method, the production method contains processes where the solution is cast on a support into a film and the formed film is dried, and the surface in contact with the support out of the surfaces of the film is kept as it is in contact with the support until the surface of the film satisfies the following requirements (e) and (f) at the same time:
   (e) the surface not in contact with the support out of the surfaces of the film is in a state where it has a central line average surface roughness of not more than 3 nm, and the number of the surface protrusions of the film whose circle equivalent diameters are 30 µm or more and maximum heights are 3 µm or more is less than 3 pieces/m$^2$, and
   (f) the surface in contact with the support out of the surfaces of the film is in a state where it has a central line average surface roughness in the range of 3 to 10 nm, and the number of the surface protrusions of the film whose circle equivalent diameters are 30 µm or more and maximum heights are 3 µm or more is less than 3 pieces/m$^2$.

9. An unstretched optical film characterized in that it is an aromatic polycarbonate film produced by a solution casting method and it is produced by one of the processes of claims 3 to 8.

10. An optical film characterized in that it is an aromatic polycarbonate film produced by a solution casting method, and it is produced by subjecting the unstretched film described in claim 1, 2 or 9 to uniaxial stretching.

11. An optical film described in claim 10 characterized in that, in the conditions of the uniaxial stretching, the stretching ratio is from 1.05 to 3.2 at a stretching temperature of from (Tg−5)° C. to (Tg+30)° C.

12. A stretched optical film characterized in that a aromatic polycarbonate film produced by a solution casting method satisfies the following requirements (g) to (j) at the same time:

(g) the film is stretched in a uniaxial direction, (h) the haze value of the film is from 0.1 to 8.0%, (i) the central line average surface roughness of one surface of the film is not more than 5 nm, and the central line average surface roughness of the other surface is from 5 to 40 nm, and (j) the number of the surface protrusions whose circle equivalent diameters are 30 $\mu$m or more and maximum heights are 3 $\mu$m or more is less than 3 pieces/m$^2$ on any side of the surfaces of the film.

\* \* \* \* \*